(12) United States Patent
Fujita et al.

(10) Patent No.: US 10,593,964 B2
(45) Date of Patent: Mar. 17, 2020

(54) BIPOLAR PLATE, CELL FRAME, CELL STACK AND REDOX-FLOW BATTERY

(71) Applicant: Sumitomo Electric Industries, Ltd., Osaka-shi (JP)

(72) Inventors: Hayato Fujita, Osaka (JP); Hideyuki Yamaguchi, Osaka (JP); Takashi Kanno, Osaka (JP); Takefumi Ito, Osaka (JP); Masahiro Kuwabara, Osaka (JP); Kiyoaki Hayashi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 154 days.

(21) Appl. No.: 15/738,703

(22) PCT Filed: Jun. 16, 2016

(86) PCT No.: PCT/JP2016/067914
§ 371 (c)(1),
(2) Date: Dec. 21, 2017

(87) PCT Pub. No.: WO2016/208482
PCT Pub. Date: Dec. 29, 2016

(65) Prior Publication Data
US 2018/0190999 A1    Jul. 5, 2018

(30) Foreign Application Priority Data
Jun. 23, 2015  (JP) .................................. 2015-125352

(51) Int. Cl.
*H01M 8/026* (2016.01)
*H01M 8/18* (2006.01)
(Continued)

(52) U.S. Cl.
CPC ......... *H01M 8/026* (2013.01); *H01M 4/8626* (2013.01); *H01M 8/0258* (2013.01);
(Continued)

(58) Field of Classification Search
CPC ...... H01M 8/026; H01M 8/0263; H01M 8/20; H01M 8/0258; H01M 8/188; H01M 8/0273; H01M 2250/10; H01M 4/8626
(Continued)

(56) References Cited

U.S. PATENT DOCUMENTS 9,761,890 B2 * 9/2017 Itou .................. H01M 8/188
10,218,007 B2 * 2/2019 Hanafusa .............. H01M 8/188
(Continued)

FOREIGN PATENT DOCUMENTS

GB      2515994 A       1/2015
JP      2000-260461 A   9/2000
(Continued)

OTHER PUBLICATIONS

Machine translation of JP 2000-260461 (no date).*
Machine translation of JP 2014-207122 (no date).*

*Primary Examiner* — Amanda C. Walke
(74) *Attorney, Agent, or Firm* — Baker Botts, L.L.P.; Michael A. Sartori

(57) ABSTRACT

A bipolar plate is a bipolar plate for a battery, the bipolar plate having a positive electrode disposed on a first surface side thereof and a negative electrode disposed on a second surface side thereof, wherein at least one of the first surface and the second surface is provided with a flow path through which an electrolyte flows. The flow path includes an introduction port for the electrolyte, a discharge port for the electrolyte, and a groove section which is located between the introduction port and the discharge port and guides the electrolyte to a predetermined route. The groove section
(Continued)

10:12, 14
12:12i, 12x, 12y
14:14o, 14x, 14y
11:12x, 12y, 14x, 14y includes a plurality of vertical groove sections which extend in a vertical direction and are arranged in parallel in a direction orthogonal to the vertical direction when the bipolar plate is placed at a predetermined position in the battery.

8 Claims, 10 Drawing Sheets

(51) Int. Cl.
    *H01M 8/0258*    (2016.01)
    *H01M 8/20*    (2006.01)
    *H01M 8/0263*    (2016.01)
    *H01M 4/86*    (2006.01)
    *H01M 8/0273*    (2016.01)

(52) U.S. Cl.
    CPC .......... *H01M 8/0263* (2013.01); *H01M 8/188* (2013.01); *H01M 8/20* (2013.01); *H01M 8/0273* (2013.01); *H01M 2250/10* (2013.01); *Y02B 90/14* (2013.01); *Y02E 60/528* (2013.01)

(58) Field of Classification Search
    USPC .......................................................... 429/105
    See application file for complete search history.

(56) References Cited

U.S. PATENT DOCUMENTS

| | | | |
|---|---|---|---|
| 2012/0244395 A1* | 9/2012 | Perry | H01M 8/0265 429/51 |
| 2012/0258345 A1* | 10/2012 | Zaffou | H01M 4/8605 429/105 |
| 2014/0060666 A1 | 3/2014 | Evans et al. | |
| 2016/0190628 A1* | 6/2016 | Young | H01M 8/188 429/51 |
| 2018/0274114 A1* | 9/2018 | Ono | C25B 1/003 |
| 2018/0277858 A1* | 9/2018 | Fujita | H01M 8/2483 |
| 2018/0358633 A1* | 12/2018 | Kanno | H01M 8/0258 |
| 2018/0375115 A1* | 12/2018 | Kanno | H01M 8/0247 |

FOREIGN PATENT DOCUMENTS

| | | |
|---|---|---|
| JP | 2002-367659 A | 12/2002 |
| JP | 2014-207122 A | 10/2014 |
| JP | 2015-138771 A | 7/2015 |
| WO | 2013/095378 A1 | 6/2013 |

* cited by examiner

BIPOLAR PLATE, CELL FRAME, CELL STACK AND REDOX-FLOW BATTERY

TECHNICAL FIELD

The present invention relates to a bipolar plate which is a component of a redox-flow battery, a cell frame, a cell stack and a redox-flow battery. More particularly, the invention relates to a bipolar plate which can decrease internal resistance in a cell.

BACKGROUND ART

In recent years, with the electric power shortage becoming more serious, rapid introduction of natural energy, such as wind power generation and photovoltaic power generation, and stabilization of electric power systems (e.g., maintenance of frequencies and voltages) have become issues to be addressed globally. As one of the measures to address the issues, installation of large-capacity storage batteries to achieve, for example, smoothing of output fluctuation, accumulation of surplus power, and load leveling has been receiving attention.

One of large-capacity storage batteries is a redox-flow battery (hereinafter, may be referred to as an "RF battery"). An RF battery is a battery which performs charging and discharging by using a positive electrode electrolyte and a negative electrode electrolyte, each containing metal ions (active material) whose valence is changed by oxidation-reduction. FIG. 7 shows an operating principle diagram of a vanadium-based RF battery 100 which uses a vanadium electrolyte containing V ions serving as an active material for each of the positive electrode electrolyte and the negative electrode electrolyte. In a battery cell 100C shown in FIG. 7, solid-line arrows and broken-line arrows indicate a charge reaction and a discharge reaction, respectively.

The RF battery 100 includes a battery cell 100C which is separated into a positive electrode cell 102 and a negative electrode cell 103 by a membrane 101 that allows hydrogen ions to permeate therethrough. The positive electrode cell 102 contains a positive electrode 104 and is connected via conduits 108 and 110 to a positive electrode electrolyte tank 106 that stores a positive electrode electrolyte. Similarly, the negative electrode cell 103 contains a negative electrode 105 and is connected via conduits 109 and 111 to a negative electrode electrolyte tank 107 that stores a negative electrode electrolyte. The electrolytes stored in the positive electrode electrolyte tank 106 and the negative electrode electrolyte tank 107 are circulated into the positive electrode cell 102 and the negative electrode cell 103 by pumps 112 and 113, respectively, during charging and discharging.

The battery cell 100C is usually formed inside a structure referred to as a cell stack 200 as shown in the lower view of FIG. 8. The cell stack 200 has a structure, as shown in the upper view of FIG. 8, in which a plurality of battery cells 100C are stacked, each battery cell 100C being formed by stacking a positive electrode 104, a membrane 101, and a negative electrode 105 and sandwiched between cell frames 120, each cell frame 120 including a picture frame-like frame body 122 and a bipolar plate 121 integrated therewith. That is, a battery cell 100C is formed between bipolar plates 121 of adjacent cell frames 120, and a positive electrode 104 (positive electrode cell 102) of a battery cell 100C and a negative electrode 105 (negative electrode cell 103) of an adjacent battery cell 100C are disposed with a bipolar plate 121 therebetween, on the front and back side of the bipolar plate 121. In this structure, gaps between the individual cell frames 120 are sealed with a sealing structure 127.

In the cell stack 200, circulation of electrolytes into battery cells 100C is performed by liquid supplying manifolds 123 and 124 and liquid discharging manifolds 125 and 126 formed on frame bodies 122. A positive electrode electrolyte is supplied from a liquid supplying manifold 123 through a groove formed on one surface side (front side of the sheet) of a frame body 122 to a positive electrode 104 disposed on a first surface side of a bipolar plate 121. The positive electrode electrolyte is discharged through a groove formed on the upper part of the frame body 122 to a liquid discharging manifold 125. Similarly, a negative electrode electrolyte is supplied from a liquid supplying manifold 124 through a groove formed on the other surface side (back side of the sheet) of the frame body 122 to a negative electrode 105 disposed on a second surface side of the bipolar plate 121. The negative electrode electrolyte is discharged through a groove formed on the upper part of the frame body 122 to a liquid discharging manifold 126.

As each of the positive electrode 104 and the negative electrode 105, for example, a porous conductive material such as carbon felt is used, and as the bipolar plate 121, for example, a flat plate made of a plastic carbon is used (Patent Literature 1).

CITATION LIST

Patent Literature

PTL 1: Japanese Unexamined Patent Application Publication No. 2002-367659

SUMMARY OF INVENTION

Technical Problem

Further improvements in the battery performance of a redox-flow battery are desired, and as one of the improvements, a decrease in internal resistance of the battery is required. One of the factors that increase the internal resistance is the electrolyte flow state, e.g., electrolyte flow uniformity over a wide area of an electrode. However, regarding decreasing internal resistance upon full consideration of the electrolyte flow state in an electrode, sufficient studies have not been necessarily done in related art.

The present invention has been made under these circumstances, and an object of the present invention is to provide a bipolar plate which can decrease internal resistance in a cell. Another object of the present invention is to provide a cell frame including the bipolar plate, a cell stack including the cell frame, and a redox-flow battery including the cell stack.

Solution to Problem

A bipolar plate according to an embodiment of the present invention is a bipolar plate for a battery, the bipolar plate having a positive electrode disposed on a first surface side thereof and a negative electrode disposed on a second surface side thereof, wherein at least one of the first surface and the second surface is provided with a flow path through which an electrolyte flows. The flow path includes an introduction port for the electrolyte, a discharge port for the electrolyte, and a groove section which is located between the introduction port and the discharge port and guides the electrolyte to a predetermined route. The groove section includes a plurality of vertical groove sections which extend in a vertical direction and are arranged in parallel in a direction orthogonal to the vertical direction when the bipolar plate is placed at a predetermined position in the battery.

A cell frame according to an embodiment of the present invention includes the bipolar plate according to the embodiment of the present invention and a frame body provided on an outer periphery of the bipolar plate.

A cell stack according to an embodiment of the present invention includes a plurality of layered bodies which are stacked, each layered body including the cell frame according to the embodiment of the present invention, a positive electrode, a membrane, and a negative electrode stacked in this order.

A redox-flow battery according to an embodiment of the present invention includes the cell stack according to the embodiment of the present invention.

Advantageous Effects of Invention

The bipolar plate can decrease internal resistance in a cell. The cell frame, the cell stack, and the redox-flow battery each can decrease internal resistance in a cell.

Figure 1:
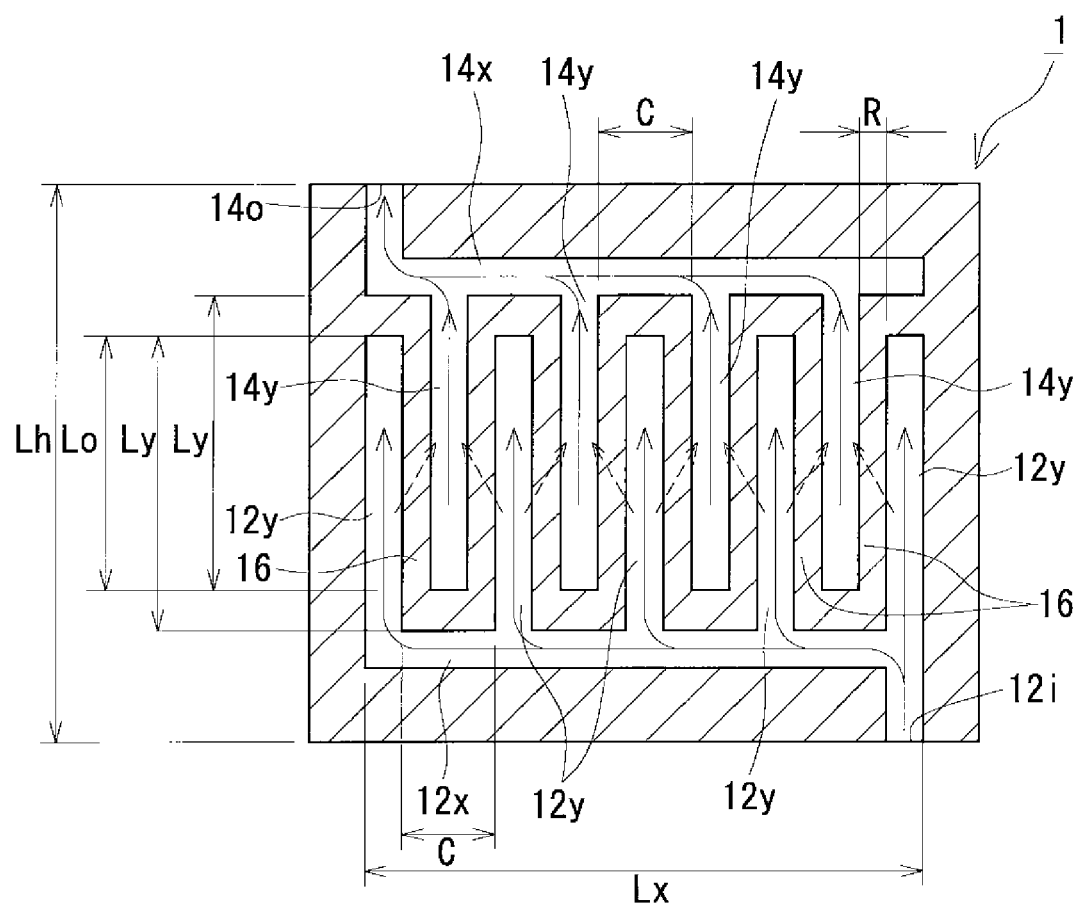
FIG. 1 is a schematic plan view showing a bipolar plate according to Embodiment 1.

REFERENCE SIGNS LIST 100 redox-flow battery (RF battery)
100C battery cell
101 membrane
102 positive electrode cell
103 negative electrode cell
104 positive electrode
105 negative electrode
106 positive electrode electrolyte tank
107 negative electrode electrolyte tank
108 to 111 conduit
112, 113 pump
200 cell stack
120 cell frame
121 bipolar plate
122 frame body
123, 124 liquid supplying manifold
125, 126 liquid discharging manifold
127 sealing structure
1, 2, 3, 4, 5 bipolar plate
10 flow path
11 groove section
12 introducing path
12$i$ introduction port
12$y$ introduction-side vertical groove section
12$x$ introduction-side horizontal groove section (liquid supply rectifying portion)
14 discharging path
14$o$ discharge port
14$y$ discharge-side vertical groove section
14$x$ discharge-side horizontal groove section (liquid discharge rectifying portion)
16 ridge portion
18$y$, 19$y$ vertical groove section
18$x$, 19$x$ horizontal groove section

DESCRIPTION OF EMBODIMENTS

Description of Embodiments of the Present Invention

For the purpose of decreasing internal resistance, the present inventors have studied the electrolyte flow state in an electrode plane. As a result, it has been found that, when a bipolar plate is provided with a flow path that guides an electrolyte, the electrolyte easily permeates/diffuses into the electrode, and battery reactions can be conducted uniformly over a wide area of the electrode; thus, it is possible to decrease internal resistance. However, as will be described later in detail in test examples, it has been found that the internal resistance may vary depending on the form of a flow path provided in a bipolar plate. The variation in internal resistance mainly occurred during a period from immediately after start of operation of a redox-flow battery (RF battery) to about several to several tens of cycles. In particular, the variation in internal resistance occurred in the case where an electrolyte was filled into a battery cell which was empty without an electrolyte before start of operation of an RF battery, and then, the RF battery was operated. Examples of such a case include the case where, in the initial state of an RF battery in which a battery cell is in an empty state without being filled with an electrolyte, an electrolyte is supplied to the battery cell, and then the RF battery is operated, and the case where, in the standby state of an RF battery in which a pump is stopped and an electrolyte is discharged from a battery cell in order to suppress self-discharge, the electrolyte is supplied again, and then the RF battery is started.

In the case where an electrolyte is filled into a battery cell which is in an empty state before starting operation of an RF battery, and then the RF battery is operated, the cause for occurrence of the variation is considered to be bubbles that can be generated when the electrolyte is filled into the battery cell. The battery cell in an empty state is filled with air inside. The air can be discharged by circulation of an electrolyte into the battery cell. However, since the flow speed of the electrolyte inside the battery cell is low, the force to discharge bubbles is weak, and it takes a predetermined time to discharge bubbles. Accordingly, depending on the form of a flow path provided in the bipolar plate, bubbles are likely to remain stationary in the battery cell, in particular, in the electrode. When bubbles stay in the electrode, the battery reaction area in the electrode is decreased, and internal resistance is considered to be increased. Accordingly, the present inventors have further conducted studies on suppressing bubbles from remaining stationary in an electrode when operation of an RF battery is started after being filled with an electrolyte, and achieving uniform electrolyte flow in the electrode. Thus, the invention of the present application has been completed. The contents of embodiments of the present invention will be enumerated and described below.

(1) A bipolar plate according to an embodiment of the present invention is a bipolar plate for a battery, the bipolar plate having a positive electrode disposed on a first surface side thereof and a negative electrode disposed on a second surface side thereof, wherein at least one of the first surface and the second surface is provided with a flow path through which an electrolyte flows. The flow path includes an introduction port for the electrolyte, a discharge port for the electrolyte, and a groove section which is located between the introduction port and the discharge port and guides the electrolyte to a predetermined route. The groove section includes a plurality of vertical groove sections which extend in a vertical direction and are arranged in parallel in a direction orthogonal to the vertical direction when the bipolar plate is placed at a predetermined position in the battery.

Since the bipolar plate is provided with a flow path, electrolyte flow can be promoted along the flow path, and the flow resistance of the electrolyte in the battery cell can be decreased; thus, it is possible to decrease an electrolyte pressure loss in the battery cell. Therefore, the internal resistance of the battery can be decreased. Since the vertical groove sections which guide the electrolyte to a predetermined route are disposed so as to extend in the vertical direction when the bipolar plate is placed at a predetermined position in the battery, bubbles are likely to be discharged upward at the time of supplying an electrolyte to the battery cell in the empty state before start of operation of the RF battery, and bubbles are unlikely to remain. Furthermore, even if bubbles occur in the battery cell, the bubbles are likely to flow along the vertical groove sections due to buoyancy and likely to be discharged. Therefore, bubbles are unlikely to remain stationary in the electrode when operation of the RF battery is started after the battery cell is filled with the electrolyte. Accordingly, it is possible to suppress a decrease in the battery reaction area in the electrode, and it is possible to suppress an increase in internal resistance of the battery.

(2) According to an example of the bipolar plate, a length for which adjacent vertical groove sections overlap each other in the parallel direction is 45% or more of a length in the vertical direction of the bipolar plate.

As the length of the vertical groove section increases, the length of the flow path extending in the vertical direction of the bipolar plate can be increased. When the length for which the vertical groove sections overlap each other in the parallel direction is 45% or more of the length in the vertical direction of the bipolar plate, bubbles generated in the battery cell are more likely to be discharged upward along the vertical groove sections, and bubbles are unlikely to remain stationary in the electrode.

(3) According to an example of the bipolar plate, an inter-groove distance between side edges of adjacent vertical groove sections is 100% to 700% of a width of the vertical groove section.

As the cross-sectional area of the vertical groove section increases, the flow resistance of the electrolyte in the battery cell decreases, and a pressure loss can be easily decreased. Furthermore, as the distance between adjacent vertical groove sections increases, the contact area between the bipolar plate and the electrode increases, and battery reactions can be easily conducted uniformly over a wide area of the electrode. When the inter-groove distance between side edges of adjacent vertical groove sections is 100% or more of the width of the vertical groove section the flow resistance of the electrolyte in the battery cell can be easily decreased. When the inter-groove distance is 700% or less of the width of the vertical groove section battery reactions in the electrode can be easily conducted uniformly.

(4) According to an example of the bipolar plate, the vertical groove section has a width of 0.1 to 10 mm.

When the vertical groove section has a width of 0.1 mm or more, the flow resistance of the electrolyte in the battery cell can be easily decreased. On the other hand, when the vertical groove section has a width of 10 mm or less, since the distance between vertical groove sections can be relatively secured, battery reactions in the electrode can be easily conducted uniformly.

(5) According to an example of the bipolar plate, the flow path includes an introducing path and a discharging path which are not in communication with each other.

In the bipolar plate, a battery reaction zone in the electrode is disposed such that the electrolyte traverses between the introducing path and the discharging path. The electrolyte introduced from the introduction port traverses between the paths and is discharged from the discharge port, and therefore, it is possible to decrease the amount of the electrolyte that is discharged in an unreacted state. That is, it is possible to increase the amount of reaction current in the electrode.

(6) According to an example of the bipolar plate in which the flow path includes the introducing path and the discharging path, the introducing path and the discharging path each include a comb-tooth-shaped path, the comb-tooth-shaped paths being arranged to face each other in an interlocking manner, and the comb-tooth-shaped paths are provided with the vertical groove sections.

In the bipolar plate, since the introducing path and the discharging path are arranged to face each other in an interlocking manner and in parallel, a battery reaction zone is disposed so as to traverse between comb teeth in a portion where the comb-tooth-shaped paths are interlocked with each other. The amount of the electrolyte flowing in the battery reaction zone that traverses between comb teeth can be easily increased compared with the case where the introducing path and the discharging path are not interlocked with each other. That is, the amount of reaction current in the electrode can be more easily increased.

(7) According to an example of the bipolar plate provided with the comb-tooth-shaped paths, a length of the portion where the comb-tooth-shaped paths are interlocked with each other is 80% to 99% of a length of the vertical groove section.

In the case where the introducing path and the discharging path are arranged to face each other in an interlocking manner, as the length of the interlocking portion increases, a larger battery reaction zone in the electrode can be secured in proportion to the length. When the length of the portion where the comb-tooth-shaped paths are interlocked with each other is 80% or more of the length of the vertical groove section, the battery reaction zone in the electrode can be sufficiently secured, and the amount of the electrolyte supplied to this area can be increased. On the other hand, when the length of the portion where the comb-tooth-shaped paths are interlocked with each other is 99% or less of the length of the vertical groove section, the introducing path and the discharging path can be reliably made independent from each other, without communicating with each other.

(8) According to an example of the bipolar plate, both surfaces of the bipolar plate are provided with the flow path, and when the bipolar plate is viewed in perspective plan, the vertical groove sections on the positive electrode side and the vertical groove sections on the negative electrode side are at least partly located at positions that do not overlap each other.

Since the vertical groove sections on the positive electrode side and the vertical groove sections on the negative electrode side are shifted from each other, when a positive electrode, a negative electrode, and a membrane are sandwiched between a pair of bipolar plates in a battery cell, the vertical groove sections of one of the bipolar plates and the vertical groove sections of the other bipolar plate are disposed while being shifted from each other. Accordingly, mechanical strength increases, and the thickness of the bipolar plate can be decreased compared with the case where the vertical groove sections of a pair of bipolar plates are arranged to face each other.

(9) According to an example of the bipolar plate, the groove section includes at least one of a liquid supply rectifying portion which connects the introduction port to all introduction-side ends of the vertical groove sections and a liquid discharge rectifying portion which connects the discharge port to all discharge-side ends of the vertical groove sections.

When the bipolar plate is provided with a liquid supply rectifying portion as the flow path, the electrolyte introduced from the introduction port can be uniformly distributed to the individual vertical groove sections. Furthermore, when the bipolar plate is provided with a liquid discharge rectifying portion as the flow path, the electrolyte from the individual vertical groove sections can be discharged from the discharge port without hindrance.

(10) A cell frame according to an embodiment of the present invention includes the bipolar plate according to any one of (1) to (9) and a frame body provided on an outer periphery of the bipolar plate.

Since the cell frame includes the bipolar plate according to the embodiment of the present invention, the flow resistance of the electrolyte in the battery cell can be decreased, and it is possible to suppress a decrease in the battery reaction area in the electrode; thus, the internal resistance of the battery can be decreased.

(11) A cell stack according to an embodiment of the present invention includes a plurality of layered bodies which are stacked, each layered body including the cell frame according to (10), a positive electrode, a membrane, and a negative electrode stacked in this order.

Since the cell stack includes the cell frame according to the embodiment of the present invention, the flow resistance of the electrolyte in the battery cell can be decreased, and it is possible to suppress a decrease in the battery reaction area in the electrode; thus, the internal resistance of the battery can be decreased.

(12) A redox-flow battery according to an embodiment of the present invention includes the cell stack according to (11).

Since the redox-flow battery includes the cell stack according to the embodiment of the present invention, the flow resistance of the electrolyte in the battery cell can be decreased, and it is possible to suppress a decrease in the battery reaction area in the electrode; thus, the internal resistance of the battery can be decreased.

DETAILED DESCRIPTION OF EMBODIMENTS OF THE PRESENT INVENTION

The embodiments of the present invention will be described in detail below. The present invention is not limited to the examples, but the scope of the present invention is defined by the appended claims, and is intended to include all modifications within the meaning and scope equivalent to those of the claims. In the drawings, the same reference signs denote the same components.

Embodiment 1

In Embodiment 1, a bipolar plate 1 to be used in a redox-flow battery (RF battery) will be described with reference to FIGS. 1 and 2. The same structure as that of the existing RF battery 100 described with reference to FIGS. 7 and 8 can be employed as a structure other than the bipolar plate 1 and therefore, a detailed description thereof will be omitted. In FIG. 2, a bipolar plate 121 is shown to be thicker than each of a positive electrode 104 and a negative electrode 105, for convenience of explanation.

[Bipolar Plate]

Figure 2:
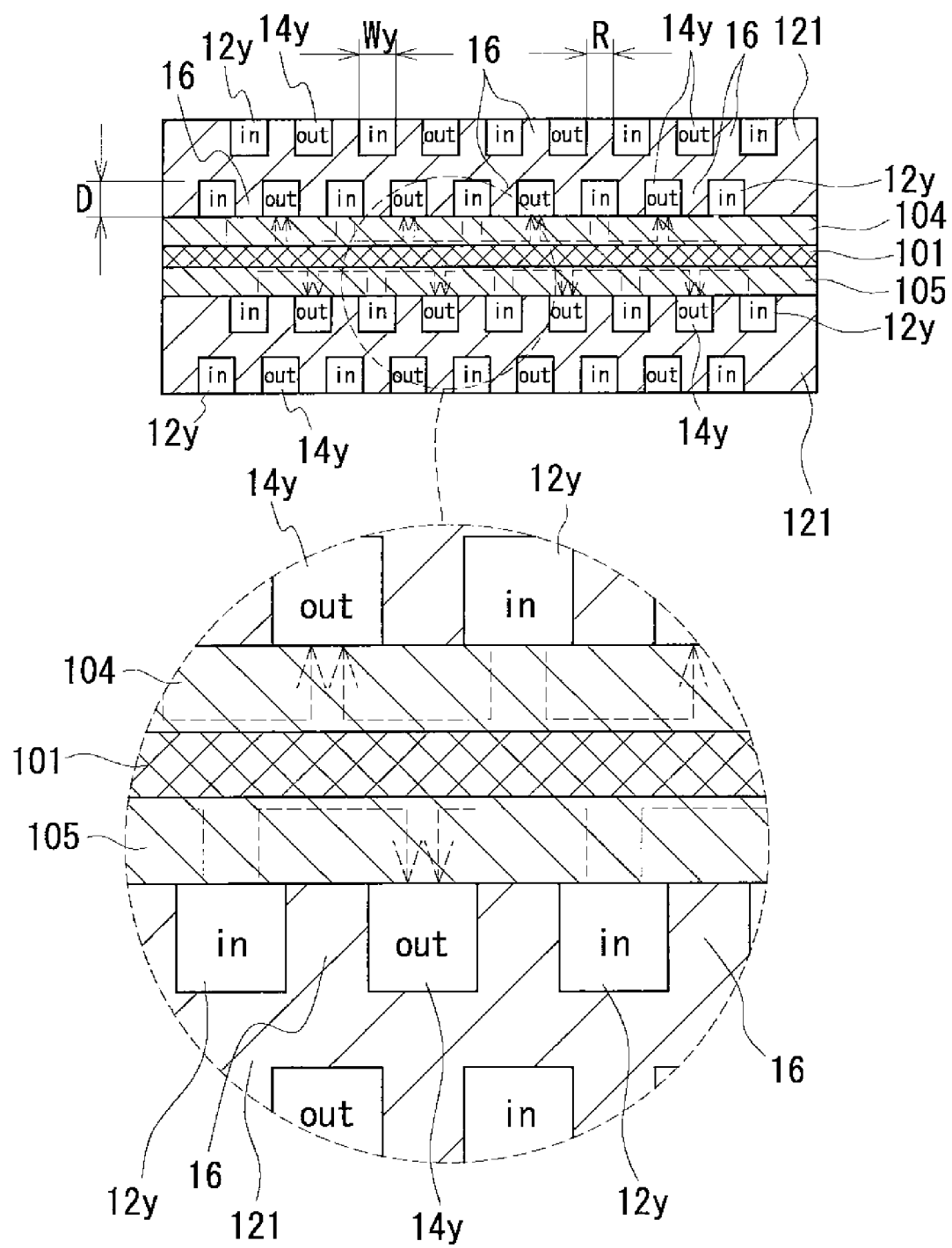
FIG. 2 is a schematic cross-sectional view showing the bipolar plate according to Embodiment 1.

A bipolar plate 1 is a conductive member which is interposed between adjacent battery cells 100C (FIG. 7) and separates the electrolytes of the individual electrodes, and is typically a rectangular flat plate as shown in FIG. 1. The bipolar plate 1 is sandwiched, at the front and back surfaces thereof, between a positive electrode 104 of one of adjacent battery cells 100C and a negative electrode 105 of the other battery cell 100C. A first surface (front surface) of the bipolar plate 1 is a surface facing the positive electrode 104, and a second surface (back surface) of the bipolar plate 1 is a surface facing the negative electrode 105. The bipolar plate 1 according to Embodiment 1 is characterized mainly in that each of a positive electrode 104 side surface of the bipolar plate 1 and a negative electrode 105 side surface of the bipolar plate 1 is provided with a flow path 10 through which a positive electrode electrolyte or negative electrode electrolyte flows, and the flow path 10 has a vertical groove structure.

Flow Path

The flow path 10 is provided in order to adjust the flow of the electrolyte circulated to the positive electrode 104 or negative electrode 105 by the pump 112 or 113 (FIG. 7) in each battery cell 100C. At each of the positive electrode 104 side surface of the bipolar plate 1 and the negative electrode 105 side surface of the bipolar plate 1, the flow path 10 is formed of a flow path inner surface which is part of the surface of the bipolar plate 1. The flow path inner surface includes, as shown in FIG. 2, a bottom face receding in the depth direction of the bipolar plate 1 and two side faces extending perpendicularly from the bottom face.

Figure 8:
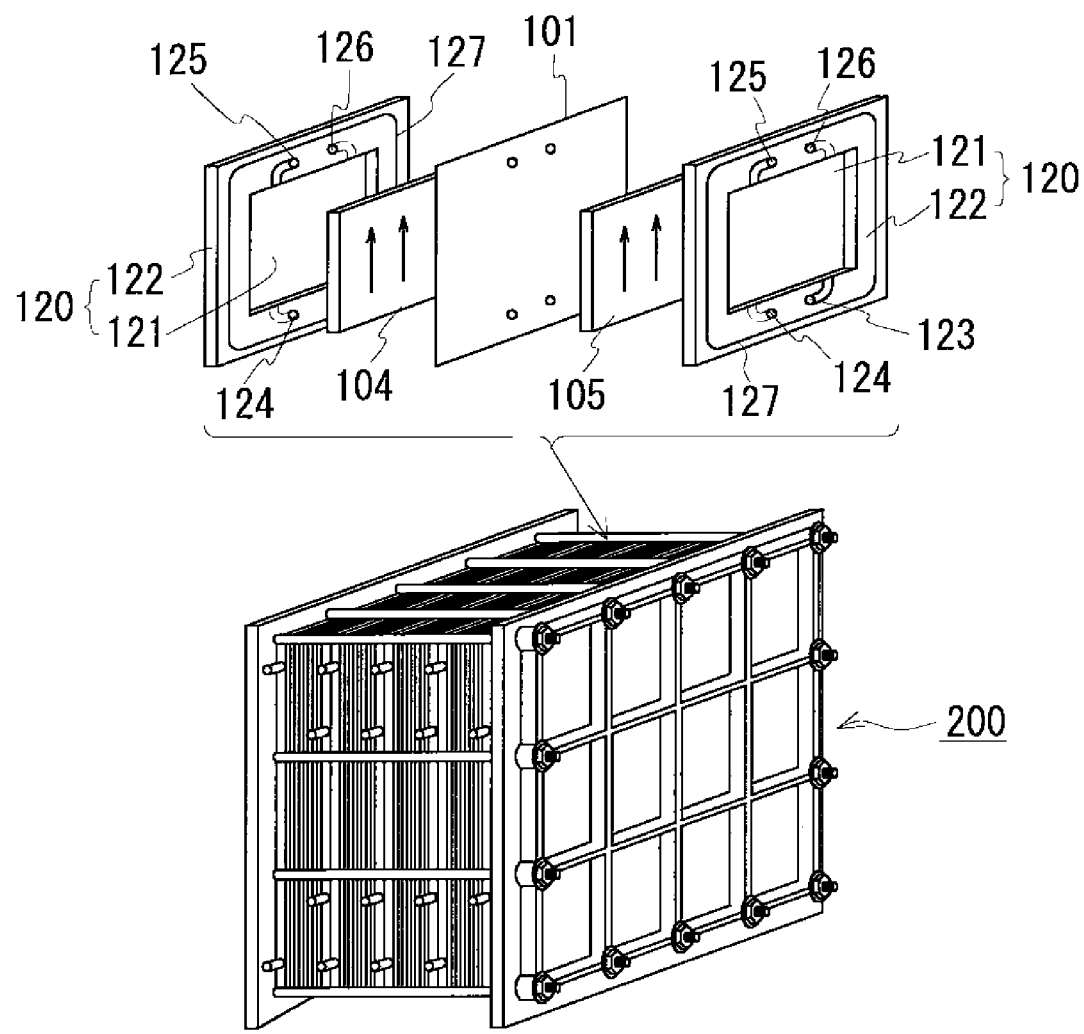
FIG. 8 is a schematic diagram of a cell stack included in a redox-flow battery.

The flow path 10 includes an introduction port 12i for the electrolyte, a discharge port 14o for the electrolyte, and a groove section 11 which is located between the introduction port 12i and the discharge port 14o and guides the electrolyte to a predetermined route. The introduction port 12*i* opens at one end face of the bipolar plate 1 (lower side of FIG. 1) and is connected, through a slit formed in the frame body of the cell frame, to the liquid supplying manifold 123 (124) (FIG. 8). The discharge port 14*o* opens at the other end face of the bipolar plate 1 (upper side of FIG. 1) opposite to the introduction port 12*i* and is connected, through a slit formed in the frame body of the cell frame, to the liquid discharging manifold 125 (126) (FIG. 8).

The electrolyte flow in each battery cell 100C can be adjusted by adjusting the shape, size, and the like of the flow path 10. One of the characteristics of the bipolar plate 1 according to Embodiment 1 is that the groove section 11 includes a plurality of introduction-side vertical groove sections 12*y* and a plurality of discharge-side vertical groove sections 14*y* which extend in a vertical direction and are arranged in parallel in a direction orthogonal to the vertical direction when the bipolar plate 1 is placed at a predetermined position in the RF battery 100. The form of the flow path 10 including a plurality of introduction-side vertical groove sections 12*y* and a plurality of discharge-side vertical groove sections 14*y* which are arranged in the vertical direction is referred to as a "vertical groove structure". The shape of the flow path 10 will be described below, and then, the groove sections 11 in the flow path 10 will be described.

Shape of Flow Path

The flow path 10 includes, as shown in FIG. 1, an introducing path 12 for introducing the electrolyte into the electrode and a discharging path 14 for discharging the electrolyte from the electrode. The introducing path 12 and the discharging path 14 are not in communication with each other and are independent from each other. The introducing path 12 and the discharging path 14 each include a comb-tooth-shaped path, the comb-tooth-shaped paths being arranged to face each other in an interlocking manner. The comb-tooth-shaped path of the introducing path 12 includes a plurality of introduction-side vertical groove sections 12*y*, and the comb-tooth-shaped path of the discharging path 14 includes a plurality of discharge-side vertical groove sections 14*y*. That is, one of the characteristics of the bipolar plate 1 according to Embodiment 1 is that the flow path 10 has an interlocking type opposed comb-tooth shape in which the introduction-side vertical groove sections 12*y* and the discharge-side vertical groove sections 14*y* are arranged to face each other in an interlocking manner.

The introducing path 12 includes the introduction port 12*i*, an introduction-side horizontal groove section 12*x* which extends in the horizontal direction of the bipolar plate 1 (in the leftward/rightward direction in FIG. 1), and a plurality of introduction-side vertical groove sections 12*y* which extend from the introduction-side horizontal groove section 12*x* in the longitudinal direction of the bipolar plate 1 (in the upward/downward direction in FIG. 1) and are arranged in parallel with a predetermined distance C therebetween. The introduction port 12*i*, the introduction-side horizontal groove section 12*x*, and the introduction-side vertical groove sections 12*y* are continuous.

The discharging path 14 has the same shape as that of the introducing path 12. The discharging path 14 includes the discharge port 14*o*, a discharge-side horizontal groove section 14*x* which extends in the horizontal direction of the bipolar plate 1, and a plurality of discharge-side vertical groove sections 14*y* which extend from the discharge-side horizontal groove section 14*x* in the longitudinal direction of the bipolar plate 1 and are arranged in parallel with a predetermined distance C therebetween. The discharge port 14*o*, the discharge-side horizontal groove section 14*x*, and the discharge-side vertical groove sections 14*y* are continuous.

The flow path 10 in this example includes the introducing path 12 and the discharging path 14, and the electrolyte introduced from the introduction port 12*i* flows through the introduction-side horizontal groove section 12*x*, the introduction-side vertical groove sections 12*y*, the discharge-side vertical groove sections 14*y*, and the discharge-side horizontal groove section 14*x* and is discharged from the discharge port 14*o*. That is, the groove section 11 of the flow path 10 is constituted by the introduction-side horizontal groove section 12*x*, the introduction-side vertical groove sections 12*y*, the discharge-side vertical groove sections 14*y*, and the discharge-side horizontal groove section 14*x*.

Regarding the introducing path 12 and the discharging path 14, the introduction-side vertical groove sections 12*y* and the discharge-side vertical groove sections 14*y* are alternately arranged in parallel. Specifically, a discharge-side vertical groove section 14*y* of the discharging path 14 is disposed between adjacent introduction-side vertical groove sections 12*y* of the introducing path 12. In other words, an introduction-side vertical groove section 12*y* of the introducing path 12 is disposed between adjacent discharge-side vertical groove sections 14*y* of the discharging path 14. When the bipolar plate 1 is placed at a predetermined position in the RF battery 100, the introduction-side vertical groove sections 12*y* and the discharge-side vertical groove sections 14*y* are disposed so as to extend in the vertical direction (in the upward/downward direction in FIG. 1) on a surface of the bipolar plate 1 and are arranged in parallel in a direction orthogonal to the vertical direction.

The introduction-side horizontal groove section 12*x* of the introducing path 12 serves as a liquid supply rectifying portion which uniformly distributes the electrolyte introduced from the introduction port 12*i* to the individual vertical groove sections 12*y*. The discharge-side horizontal groove section 14*x* of the discharging path 14 serves as a liquid discharge rectifying portion which discharges the electrolyte from the individual discharge-side vertical groove sections 14*y* from the discharge port 14*o* without hindrance. The introduction-side horizontal groove section 12*x* and the discharge-side horizontal groove section 14*x* may be omitted, and electrolyte rectifying portions may be provided in the frame body of the cell frame as in existing techniques. In the case where the introduction-side horizontal groove section 12*x* and the discharge-side horizontal groove section 14*x* are omitted, introduction-side ends of the introduction-side vertical groove sections 12*y* are each open at one end face of the bipolar plate 1 (on the lower side in FIG. 1), and discharge-side ends of the discharge-side vertical groove sections 14*y* are each open at the other end face of the bipolar plate 1 (on the upper side in FIG. 1). An introduction port 12*i* for the electrolyte into the bipolar plate 1 serves as an opening edge of the introduction-side end of each introduction-side vertical groove section 12*y*, and a discharge port 14*o* for the electrolyte from the bipolar plate 1 serves as an opening edge of the discharge-side end of each discharge-side vertical groove section 14*y*.

In the example shown in FIG. 2, one introduction port 12*i* and one discharge port 14*o* are formed in end faces of the bipolar plate 1 through short vertical groove sections extending in the upward/downward direction from the ends in the horizontal direction of the introduction-side horizontal groove section 12*x* and the discharge-side horizontal groove section 14*x*, respectively. The introduction port 12*i* and the discharge port 14*o* are provided at substantially diagonal positions of the rectangular bipolar plate 1.

In the case of the flow path 10 having the vertical groove structure, the electrolyte introduced from the introduction port 12*i* flows along the groove section 11 (in directions indicated by solid-line arrows in FIG. 1) and also flows to traverse between the introduction-side vertical groove sections 12*y* and the discharge-side vertical groove sections 14*y* over ridge portions 16 located between the introduction-side vertical groove sections 12*y* and the discharge-side vertical groove sections 14*y* (in directions indicated by broken-line arrows in FIGS. 1 and 2). The electrolyte that flows through the groove section 11, during the period from introduction from the introduction port 12*i* to arrival at the discharge port 14*o*, permeates and diffuses into the electrode which is disposed to face the bipolar plate 1. The electrolyte which has permeated/diffused into the electrode participates in battery reactions in the electrode. In particular, in regions disposed to face ridge portions 16 of the bipolar plate 1 in each of the positive electrode 104 and the negative electrode 105, the contact area with the electrolyte can be sufficiently secured, and therefore, battery reactions can be satisfactorily conducted (FIG. 2). Since the introduced electrolyte traverses the ridge portions 16 and is discharged, it is possible to decrease the amount of the electrolyte that is discharged in an unreacted state. As a result, it is possible to increase the amount of reaction current in the electrode. Furthermore, the internal resistance of the RF battery can be decreased.

Groove Section

As shown in FIG. 2, the groove section 11 has a rectangular cross-sectional shape. The cross-sectional shape of the groove section 11 can be any cross-sectional shape and, for example, may be a shape having a curve, such as a semicircle or rectangle with rounded corner portions.

The groove section 11 has a uniform depth D over the entire flow path 10. A length Lxi of the introduction-side horizontal groove section 12*x*, a length Lyi of the introduction-side vertical groove section 12*y*, and a width Wyi of the introduction-side vertical groove section 12*y* in the introducing path 12 are equal to a length Lxo of the discharge-side horizontal groove section 14*x*, a length Lyo of the discharge-side vertical groove section 14*y*, and a width Wyo of the discharge-side vertical groove section 14*y* in the discharging path 14, respectively. Furthermore, a distance Ci between introduction-side vertical groove sections 12*y* in the introducing path 12 is equal to a distance Co between discharge-side vertical groove sections 14*y* in the discharging path 14. In the case where the shapes and sizes of the groove section 11 constituting the flow path 10 are substantially the same as described above, the electrolyte flow can be made substantially uniform over the entire region of the bipolar plate 1 and the electrode disposed to face the bipolar plate 1, which is preferable. Hereinafter, in Embodiment 1, the length Lxi of the introduction-side horizontal groove section 12*x* in the introducing path 12 and the length Lxo of the discharge-side horizontal groove section 14*x* in the discharging path 14 are referred to as "Lx", the length Lyi of the introduction-side vertical groove section 12*y* and the length Lyo of the discharge-side vertical groove section 14*y* are referred to as "Ly", the width Wyi of the introduction-side vertical groove section 12*y* and the width Wyo of the discharge-side vertical groove section 14*y* are referred to as "Wy", and the distance Ci between introduction-side vertical groove sections 12*y* and the distance Co between discharge-side vertical groove sections 14*y* are referred to as "C".

The width D of the groove section 11 may be, for example, 10% to 45% of the thickness of the bipolar plate 1. This is for the purpose of preventing a decrease in the strength of the bipolar plate 1 while sufficiently securing the cross-sectional area of the groove section 11. In the case where the front and back surfaces of the bipolar plate 1 have the groove section 11, when the depth D of the groove is excessively large, there is a concern that mechanical strength may be decreased. Therefore, the depth D of the groove is considered to be more preferably 20% to 40% of the thickness of the bipolar plate 1.

An inter-groove distance R between side edges of an introduction-side vertical groove section 12*y* and a discharge-side vertical groove section 14*y* which are adjacent to each other may be, for example, 100% to 700% of the width Wy of each of the introduction-side vertical groove section 12*y* and the discharge-side vertical groove section 14*y*. As the cross-sectional area of each of the introduction-side vertical groove section 12*y* and the discharge-side vertical groove section 14*y* increases, the flow resistance of the electrolyte in the battery cell 100C decreases, and a pressure loss can be easily decreased. On the other hand, as the distance between an introduction-side vertical groove section 12*y* and a discharge-side vertical groove section 14*y* which are adjacent to each other increases, the contact area between the bipolar plate 1 and the electrode increases, and battery reactions can be easily conducted uniformly over a wide area of the electrode. From the standpoint that the flow resistance of the electrolyte in the battery cell 100C can be decreased and battery reactions are conducted uniformly in the electrode, the inter-groove distance R is considered to be more preferably 100% to 500% of the width Wy of each of the introduction-side vertical groove section 12*y* and the discharge-side vertical groove section 14*y*.

The width Wy of each of the introduction-side vertical groove section 12*y* and the discharge-side vertical groove section 14*y* can be appropriately selected depending on the relationship with the inter-groove distance R and the width D such that the cross-sectional area is sufficiently increased. The width Wy of each of the introduction-side vertical groove section 12*y* and the discharge-side vertical groove section 14*y* is preferably 0.1 to 10 mm, or further preferably 0.7 to 1.5 mm.

As the length Ly of each of the introduction-side vertical groove section 12*y* and the discharge-side vertical groove section 14*y* increases, the length of the flow path extending in the vertical direction of the bipolar plate 1 can be increased. The ratio of the length Ly of each of the introduction-side vertical groove section 12*y* and the discharge-side vertical groove section 14*y* to a length Lh in the vertical direction of the bipolar plate 1, i.e., (Ly/Lh)×100, is preferably 50% to 90%, or further preferably 60% to 80%. Furthermore, as the length for which an introduction-side vertical groove section 12*y* and an discharge-side vertical groove section 14*y* which are adjacent to each other overlap each other increases, battery reactions due to traversing over ridge portions 16 in the electrode can be satisfactorily conducted. The ratio of a length Lo for which an introduction-side vertical groove section 12*y* and an discharge-side vertical groove section 14*y* which are adjacent to each other overlap each other to the length Lh in the vertical direction of the bipolar plate 1, i.e., (Lo/Lh)×100, is preferably 45% to 85%, and further preferably 55% to 75%.

In an interlocking type opposed comb-tooth shape, the length Lo of a portion where the comb-tooth-shaped path of the introducing path 12 and the comb-tooth-shaped path of the discharging path 14 are interlocked with each other increases, it is possible to sufficiently secure a region disposed to face the ridge portions 16 in the electrode in proportion to the length. Accordingly, the amount of the electrolyte supplied to this region can be increased. The ratio of the length Lo of the portion where the comb-tooth-shaped paths are interlocked with each other to the length Ly of each of the introduction-side vertical groove section 12y and the discharge-side vertical groove section 14y, i.e., (Lo/Ly)× 100, is preferably 80% to 99%, and further preferably 90% to 98%.

In this example, as shown in FIG. 2, in the case where the front and back surfaces of the bipolar plate 121 are provided with the flow path, when the bipolar plate 121 is viewed in perspective plan, introduction-side vertical groove sections 12y and the discharge-side vertical groove sections 14y are at least partly located at positions that do not overlap each other. Since the introduction-side vertical groove sections 12y and the discharge-side vertical groove sections 14y on the front surface of the bipolar plate 121 and the introduction-side vertical groove sections 12y and the discharge-side vertical groove sections 14y on the back surface of the bipolar plate 121 are shifted from each other, when a positive electrode 104, a negative electrode 105, and a membrane 101 are sandwiched between a pair of bipolar plates 121 in a battery cell 100C, the introduction-side vertical groove sections 12y and the discharge-side vertical groove sections 14y of one of the bipolar plates and the introduction-side vertical groove sections 12y and the discharge-side vertical groove sections 14y of the other bipolar plate are disposed while being shifted from each other, at the surfaces in contact with the respective electrodes. Because of the shift, mechanical strength increases, and the thickness of the bipolar plate can be decreased compared with the case where the introduction-side vertical groove sections 12y and the discharge-side vertical groove sections 14y of a pair of bipolar plates are arranged to face each other. In the case where the front and back surfaces of the bipolar plate 1 are provided with the flow path 10, when the bipolar plate 1 is viewed in perspective plan, the introduction-side vertical groove sections 12y and the discharge-side vertical groove sections 14y may be located at positions that overlap each other.

Constituent Material

A conductive material with a low electrical resistance that does not react with an electrolyte and has electrolyte resistance (chemical resistance, acid resistance, and the like) can be suitably used as the constituent material for the bipolar plate 1. Furthermore, the constituent material for the bipolar plate 1 preferably has moderate rigidity. The reason for this is that the shapes and sizes of the groove section 11 constituting the flow path 10 are unlikely to change for a long period of time, and the effect of decreasing flow resistance and the effect of decreasing a pressure loss due to being provided with the flow path 10 are likely to be maintained. Specific examples of the constituent material include a composite material containing a carbon material and an organic material, and more specifically, a conductive plastic containing a conductive inorganic material, such as graphite, and an organic material, such as a polyolefin-based organic compound or chlorinated organic compound, may be used.

Examples of the carbon material include, in addition to graphite, carbon black, diamond-like carbon (DLC), and the like. Examples of the carbon black include acetylene black, furnace black, and the like. The carbon material preferably includes graphite. The carbon material can contain mainly graphite and partly at least one of carbon black and DLC. The conductive inorganic material can contain, in addition to the carbon material, a metal, such as aluminum. Examples of the conductive inorganic material include powders and fibers.

Examples of the polyolefin-based organic compound include polyethylene, polypropylene, polybutene, and the like. Examples of the chlorinated organic compound include vinyl chloride, chlorinated polyethylene, chlorinated paraffin, and the like.

The bipolar plate 1 provided with the flow path 10 can be manufactured by forming the constituent material into a plate shape by a known method, such as injection molding, press molding, or vacuum molding, and also forming the groove section 11 (the introduction-side vertical groove sections 12y, the discharge-side vertical groove sections 14y, the introduction-side horizontal groove section 12x, and the discharge-side horizontal groove section 14x) constituting the flow path 10. When the groove section 11 is simultaneously formed, excellent manufacturability for the bipolar plate 1 can be achieved. It is also possible to form the groove section 11 (the introduction-side vertical groove sections 12y, the discharge-side vertical groove sections 14y, the introduction-side horizontal groove section 12x, and the discharge-side horizontal groove section 14x) constituting the flow path 10 by cutting a flat plate not provided with the flow path 10.

[Advantages]

In the case of the flow path 10 having the vertical groove structure, since introduction-side vertical groove sections 12y and discharge-side vertical groove sections 14y are arranged in the vertical direction, bubbles are unlikely to be generated when an electrolyte is supplied to the battery cell which is in an empty state before starting operation of the RF battery. Furthermore, even if bubbles occur in the battery cell, the bubbles are likely to be discharged toward the discharge port 14o. Therefore, bubbles are unlikely to remain stationary in the electrode when operation of the RF battery is started after the battery cell is filled with the electrolyte. Accordingly, it is possible to suppress a decrease in the battery reaction area in the electrode, and it is possible to suppress an increase in internal resistance of the RF battery.

In particular, when the flow path 10 has an interlocking type opposed comb-tooth shape including the introducing path 12 and the discharging path 14, a battery reaction zone is formed in the electrode so as to traverse over ridge portions 16 between introduction-side vertical groove sections 12y of the introducing path 12 and discharge-side vertical groove sections 14y of the discharging path 14. The contact area with the electrolyte can be sufficiently secured by the battery reaction zone and therefore, battery reactions can be satisfactorily conducted.

[Structure of RF Battery Other Than Bipolar Plate]

In the description of the bipolar plate 1, it has been described that the same structure as the existing structure can be employed as a structure of the RF battery 100 (refer to FIGS. 7 and 8) other than the bipolar plate 1. The RF battery according to Embodiment 1 includes a battery cell in which a positive electrode, a membrane, and a negative electrode are stacked and a cell frame including a bipolar plate integrated with a picture frame-like frame body, and a plurality of battery cells are stacked with the cell frame therebetween. The bipolar plate 1 provided with the flow path 10 according to the embodiment is used as the bipolar plate. That is, a battery cell is formed between bipolar plates 1 of adjacent cell frames, and a positive electrode and a negative electrode of adjacent battery cells are disposed on the front and back surfaces of the bipolar plate 1 so as to sandwich the bipolar plate 1.

Figure 7:
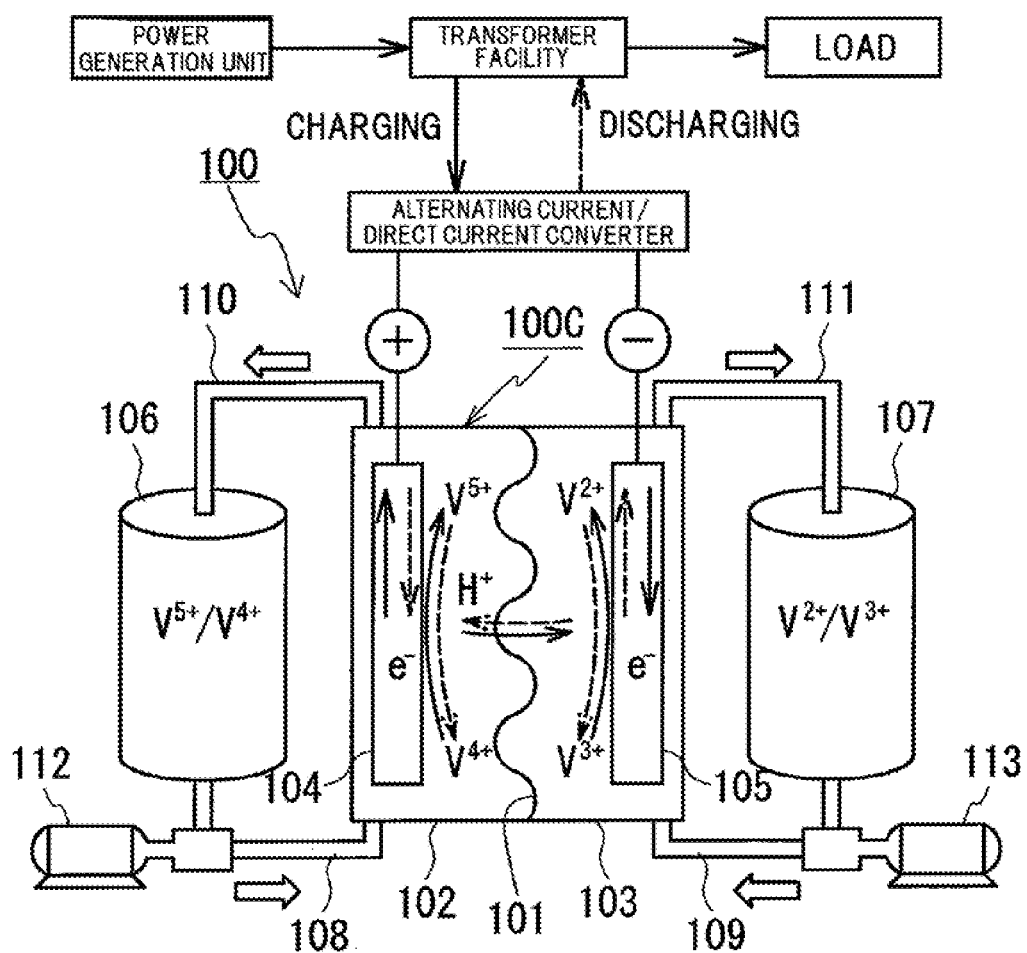
FIG. 7 is a schematic principle diagram of a redox-flow battery.

As shown in FIG. 7, a vanadium-based electrolyte in which vanadium ions are used as an active material for each electrode can be suitably used as the electrolyte. In addition to this, an iron ($Fe^{2+}/Fe^{3+}$)-chromium ($Cr^{3+}/Cr^{2+}$)-based electrolyte in which iron (Fe) ions are used as an anode active material and chromium (Cr) ions are used as a cathode active material, and a manganese ($Mn^{2+}/Mn^{3+}$)-titanium ($Ti^{4+}/Ti^{3+}$)-based electrolyte in which manganese (Mn) ions are used for a positive electrode electrolyte and titanium (Ti) ions are used for a negative electrode electrolyte can be suitably used.

Embodiment 2

In Embodiment 2, a bipolar plate 2 provided with a flow path 10 having a non-interlocking type opposed comb-tooth shape shown in FIG. 3 will be described. The non-interlocking type opposed comb-tooth shape is a shape in which a comb-tooth-shaped path of an introducing path 12 and a comb-tooth-shaped path of a discharging path 14 are arranged to face each other without being interlocked with each other. The basic structure of the bipolar plate 2 is the same as that of the bipolar plate 1 according to Embodiment 1, and only the form of the flow path 10 is different.

The introducing path 12 includes an introduction port 12*i*, an introduction-side horizontal groove section 12*x* which extends in the horizontal direction of the bipolar plate 2 (in the leftward/rightward direction in FIG. 3), and a plurality of introduction-side vertical groove sections 12*y* which extend from the introduction-side horizontal groove section 12*x* in the longitudinal direction of the bipolar plate 2 (in the upward/downward direction in FIG. 3) and are arranged in parallel with a predetermined distance therebetween. The number of the introduction-side vertical groove sections 12*y* of the bipolar plate 2 is larger than the number of the introduction-side vertical groove sections 12*y* of the bipolar plate 1, and the introduction-side vertical groove sections 12*y* of the bipolar plate 2 have a smaller length than the introduction-side vertical groove sections 12*y* of the bipolar plate 1. The introduction port 12*i*, the introduction-side horizontal groove section 12*x*, and the introduction-side vertical groove sections 12*y* are continuous.

The discharging path 14 has the same shape as that of the introducing path 12. The discharging path 14 includes a discharge port 14*o*, a discharge-side horizontal groove section 14*x* which extends in the horizontal direction of the bipolar plate 2, and a plurality of discharge-side vertical groove sections My which extend from the discharge-side horizontal groove section 14*x* in the longitudinal direction of the bipolar plate 2 and are arranged in parallel with a predetermined distance therebetween. The number of the discharge-side vertical groove sections 14*y* of the bipolar plate 2 is larger than the number of the discharge-side vertical groove sections 14*y* of the bipolar plate 1, and the discharge-side vertical groove sections 14*y* of the bipolar plate 2 have a smaller length than the discharge-side vertical groove sections 14*y* of the bipolar plate 1. In the bipolar plate 2, the number of the discharge-side vertical groove sections 14*y* is the same as the number of the introduction-side vertical groove sections 12*y*. Furthermore, the length Lyo of the discharge-side vertical groove section 14*y* is the same as the length Lyi of the introduction-side vertical groove section 12*y*. The discharge port 14*o*, the discharge-side horizontal groove section 14*x*, and the discharge-side vertical groove sections 14*y* are continuous.

In the bipolar plate 2, the introduction-side vertical groove sections 12*y* and the discharge-side vertical groove sections 14*y* are arranged symmetrically in the upward/downward direction. Accordingly, adjacent vertical groove sections are introduction-side vertical groove sections 12*y* or discharge-side vertical groove sections 14*y*. When the bipolar plate 2 is placed at a predetermined position in the RF battery 100, the introduction-side vertical groove sections 12*y* and the discharge-side vertical groove sections 14*y* are each disposed so as to extend in the vertical direction (in the upward/downward direction in FIG. 3), and also, the introduction-side vertical groove sections 12*y* are arranged in parallel to each other and the discharge-side vertical groove sections 14*y* are arranged in parallel to each other in a direction orthogonal to the vertical direction. The introduction-side vertical groove sections 12*y* and the discharge-side vertical groove sections 14*y* are arranged symmetrically in the upward/downward direction, and the ratio of the total length (Lyi+Lyo) of the length Lyi of the introduction-side vertical groove section 12*y* and the length Lyo of the discharge-side vertical groove section 14*y* to a length Lh in the vertical direction of the bipolar plate 2, i.e., [(Lyi+Lyo)/Lh]×100, may be 70% to 99%, or further 75% to 99%.

Figure 3:
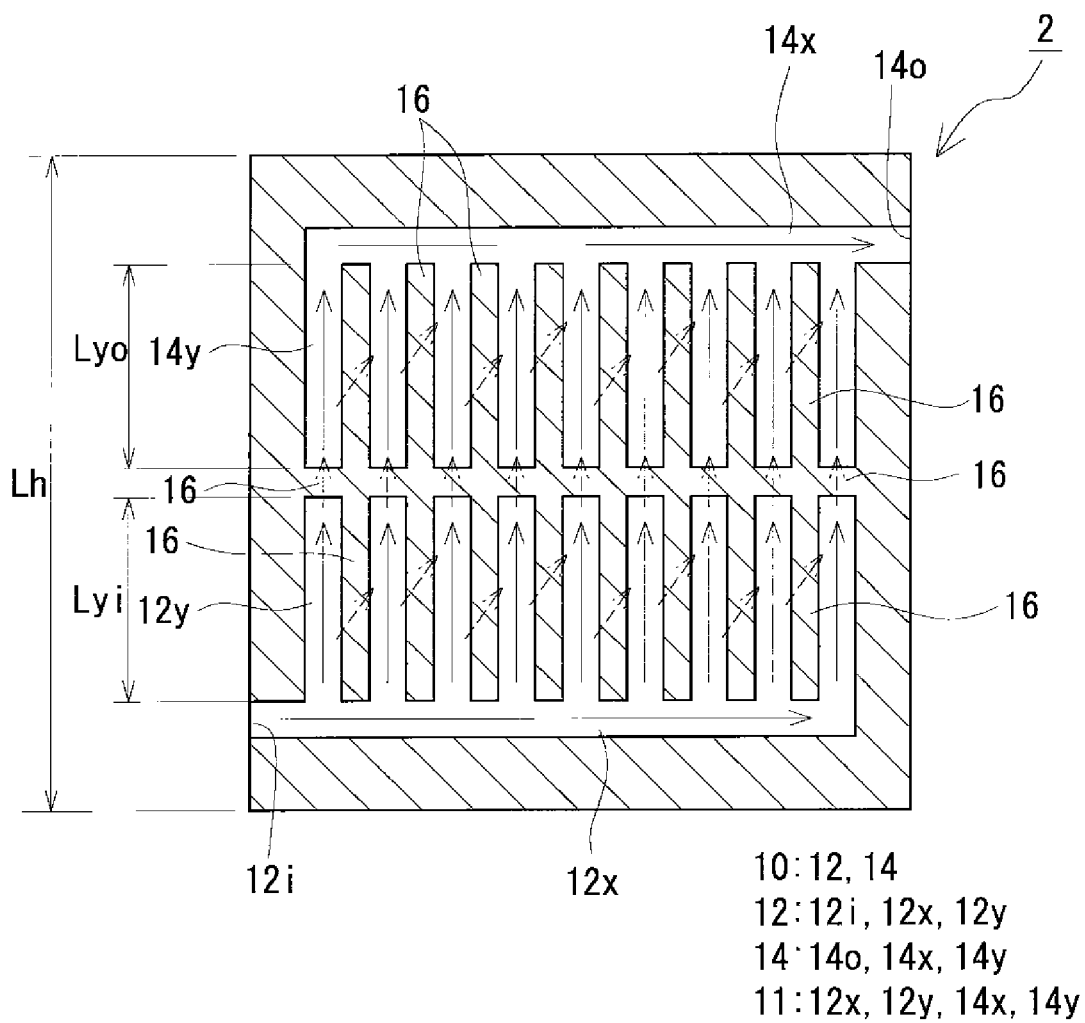
FIG. 3 is a schematic plan view showing a bipolar plate according to Embodiment 2.

The electrolyte introduced from the introduction port 12*i* flows along the groove section 11 (in directions indicated by solid-line arrows in FIG. 3), flows to traverse over ridge portions 16 located between the introduction-side vertical groove sections 12*y* and ridge portions 16 located between the discharge-side vertical groove sections 14*y* (in directions indicated by slanting broken-line arrows in FIG. 3), and flows to traverse over a ridge portion 16 located between the introduction-side vertical groove sections 12*y* of the introducing path 12 and the discharge-side vertical groove sections 14*y* of the discharging path 14 (in the longitudinal direction indicated by broken-line arrows in FIG. 3). Even in the non-interlocking type comb-tooth shape, by conducting battery reactions in the electrode so as to traverse between adjacent introduction-side vertical groove sections 12*y*, between adjacent discharge-side vertical groove sections 14*y*, and between introduction-side vertical groove sections 12*y* and the discharge-side vertical groove sections 14*y* located in the upward/downward direction, it is possible to decrease the amount of the electrolyte that is discharged in an unreacted state, and it is possible to increase the amount of reaction current in the electrode. Furthermore, the internal resistance of the RF battery can be decreased.

Furthermore, even in the non-interlocking type comb-tooth shape, since the introduction-side vertical groove sections 12*y* and the discharge-side vertical groove sections 14*y* are arranged in the vertical direction, bubbles are unlikely to remain stationary in the electrode when operation of the RF battery is started after the battery cell is filled with the electrolyte. Accordingly, it is possible to suppress a decrease in the battery reaction area in the electrode, and it is possible to suppress an increase in internal resistance of the battery.

Embodiment 3

Figure 4:
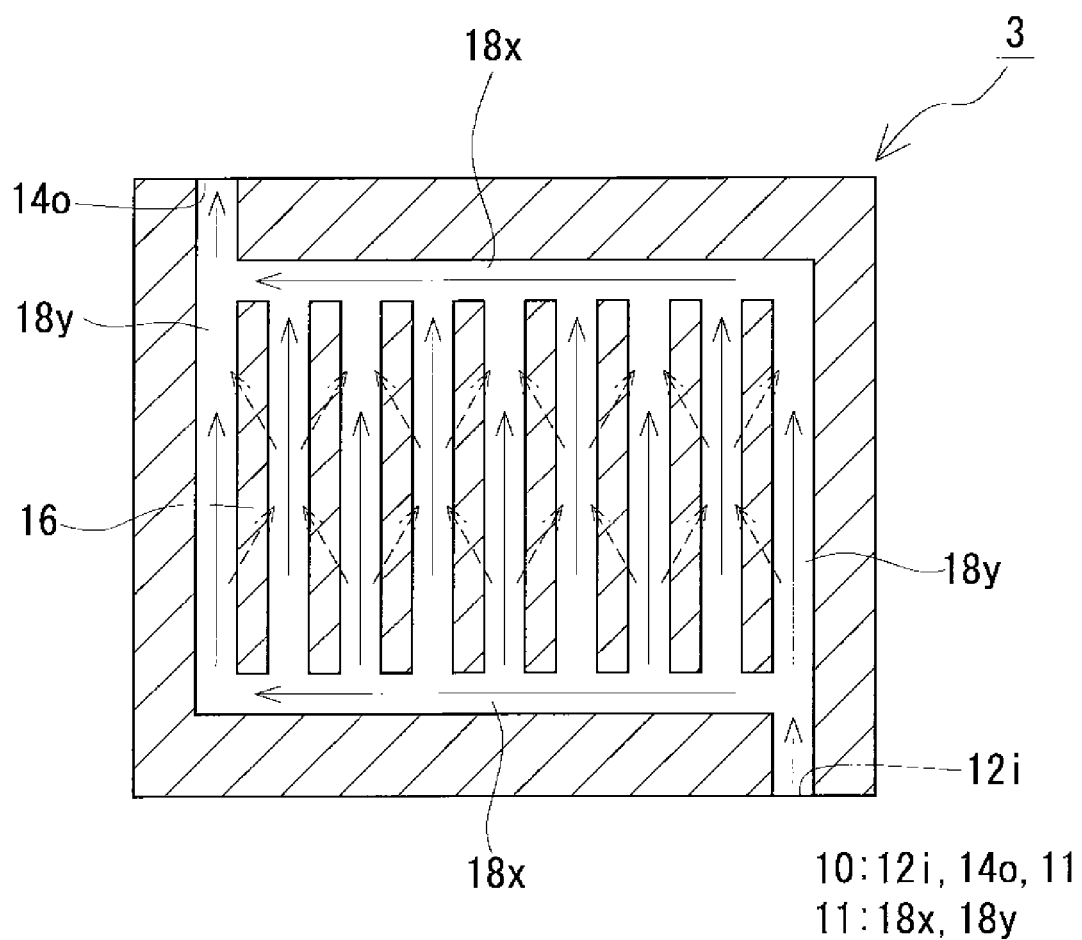
FIG. 4 is a schematic plan view showing a bipolar plate according to Embodiment 3.

In Embodiment 3, a bipolar plate 3 provided with a flow path 10 having a continuous grid shape shown in FIG. 4 will be described. The grid shape refers to the shape in which an introducing path and a discharging path are in communication with each other. The basic structure of the bipolar plate 3 is the same as that of the bipolar plate 1 according to Embodiment 1, and only the form of the flow path 10 is different.

The flow path 10 includes, as a groove section 11, a plurality of vertical groove sections 18y which extend in the longitudinal direction of the bipolar plate 3 (in the upward/downward direction in FIG. 4) and are arranged in parallel with a predetermined distance therebetween and a pair of horizontal groove sections 18x which connect introduction-side ends of the vertical groove sections 18y and discharge-side ends of the vertical groove sections 18y. The introduction-side horizontal groove section 18x (on the lower side in FIG. 4) is connected to an introduction port 12i at one end thereof (on the right side in FIG. 4) and is connected to a discharge port 14o at the other end thereof (on the left side in FIG. 4) through a vertical groove section 18y. The discharge-side horizontal groove section 18x (on the upper side in FIG. 4) is connected to the discharge port 14o at one end thereof (on the left side in FIG. 4) and is connected to the introduction port 12i at the other end thereof (on the right side in FIG. 4) through a vertical groove section 18y. The introduction port 12i, a pair of horizontal groove sections 18x, the vertical groove sections 18y, and the discharge port 14o are continuous.

In the bipolar plate 3, the electrolyte introduced from the introduction port 12i flows along the groove section 11 (in directions indicated by solid-line arrows in FIG. 4) and flows to traverse between the vertical groove sections 18y over ridge portions 16 located between the vertical groove sections 18y (in directions indicated by broken-line arrows). By conducting battery reactions in the electrode so as to traverse between vertical groove sections 18y over the ridge portion 16, it is possible to decrease the amount of the electrolyte that is discharged in an unreacted state, and it is possible to increase the amount of reaction current in the electrode. Furthermore, the internal resistance of the RF battery can be decreased.

In the bipolar plate 3, since the vertical groove section 18y communicates with the introduction port 12i to the discharge port 14o, bubbles in the battery cell are likely to be discharged and bubbles are unlikely to remain stationary in the electrode when operation of the RF battery is started after the battery cell is filled with the electrolyte. Accordingly, it is possible to more easily suppress a decrease in the battery reaction area in the electrode, and it is possible to more easily suppress an increase in internal resistance of the battery.

Embodiment 4

Figure 5:
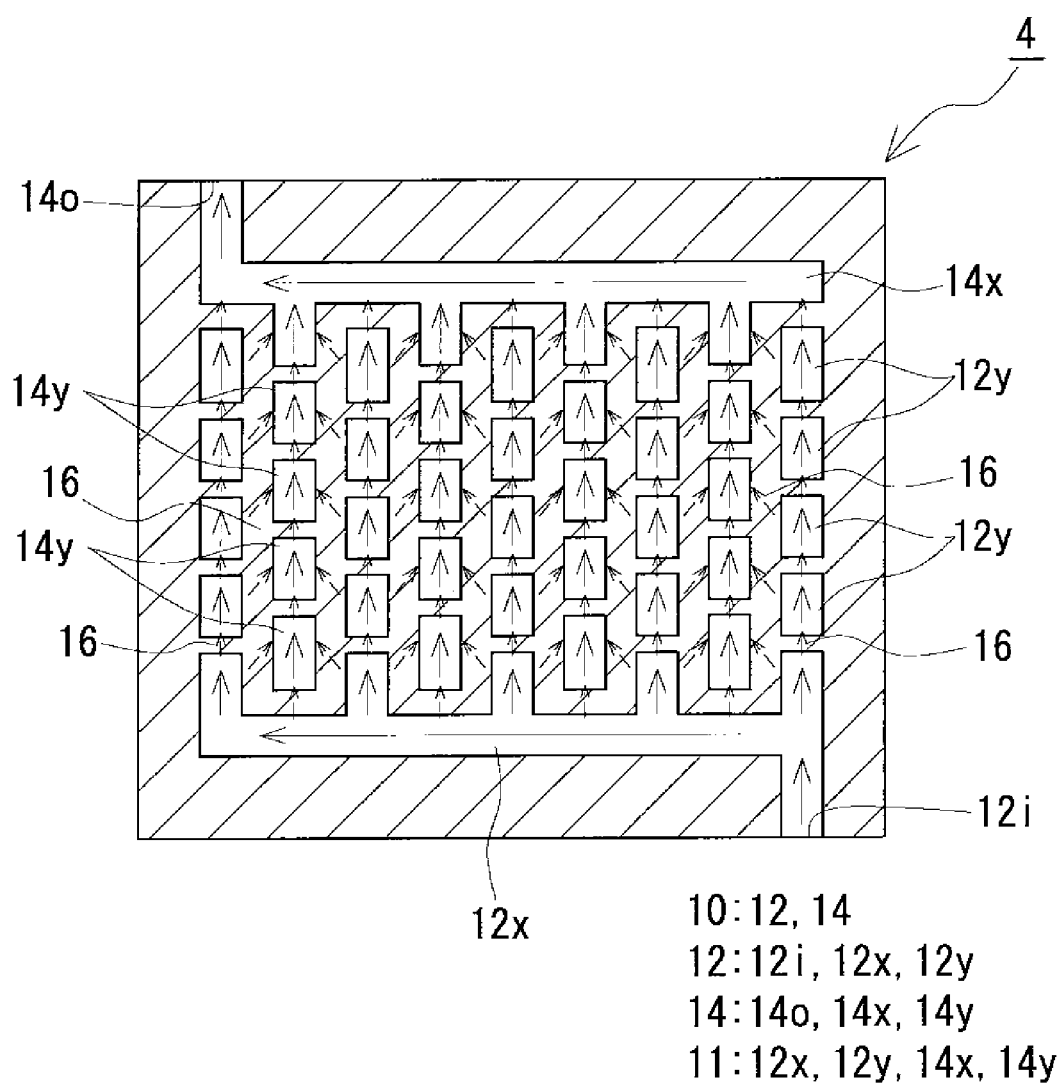
FIG. 5 is a schematic plan view showing a bipolar plate according to Embodiment 4.

In Embodiment 4, a bipolar plate 4 provided with a flow path 10 having a discontinuous shape shown in FIG. 5 will be described. The bipolar plate 4 is configured such that the introduction-side vertical groove sections 12y and the discharge-side vertical groove sections 14y in the bipolar plate 1 (FIG. 1) described in Embodiment 1 are discontinuously (non-continuously) formed. By forming the introduction-side vertical groove sections 12y and the discharge-side vertical groove sections 14y into a discontinuous shape, battery reactions in the electrode can be conducted such that the electrolyte traverses not only over the ridge portions 16 in the width direction but over ridge portions 16 between adjacent vertical groove sections in the longitudinal direction between the vertical groove sections, and it is anticipated that the amount of reaction current in the electrode can be increased.

Embodiment 5

Figure 6:
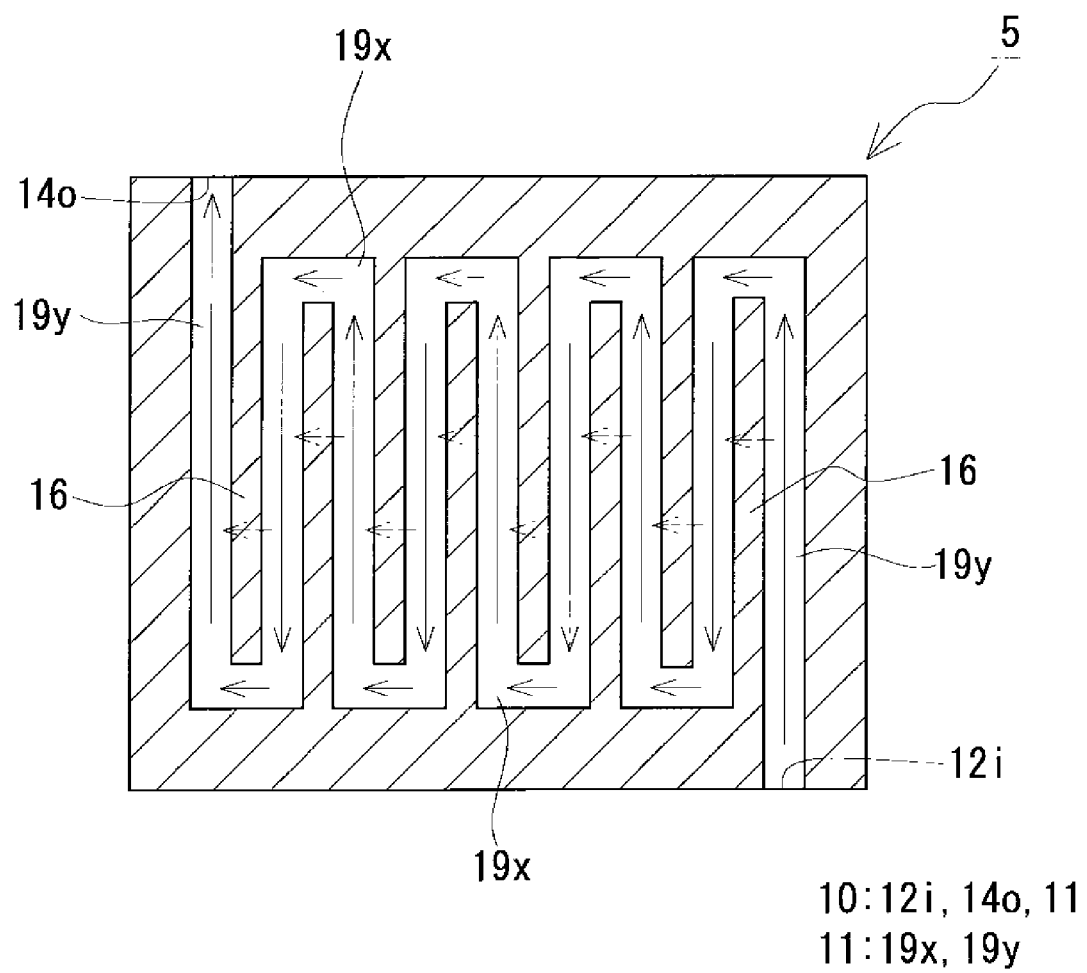
FIG. 6 is a schematic plan view showing a bipolar plate according to Embodiment 5.

In Embodiment 5, a bipolar plate 5 provided with a flow path 10 having a continuous meander shape shown in FIG. 6 will be described. The continuous meander shape refers to the shape in which a groove section 11 is continuously formed from an introduction port 12i to a discharge port 14o. The groove section 11 includes a plurality of vertical groove sections 19y which are arranged in parallel and a plurality of short horizontal groove sections 19x which connect one ends of the vertical groove sections 19y to each other or the other ends of the vertical groove sections 19y to each other alternately.

In the bipolar plate 5, the electrolyte introduced from the introduction port 12i flows along the groove section 11 (in directions indicated by solid-line arrows in FIG. 6) and flows to traverse between vertical groove sections 19y over ridge portions 16 located between the vertical groove sections 19y. By conducting battery reactions so as to traverse between the vertical groove sections 19y over the ridge portions 16, it is possible to decrease the amount of the electrolyte that is discharged in an unreacted state, and it is anticipated that the amount of reaction current in the electrode can be increased.

Embodiment 6

Figure 11:
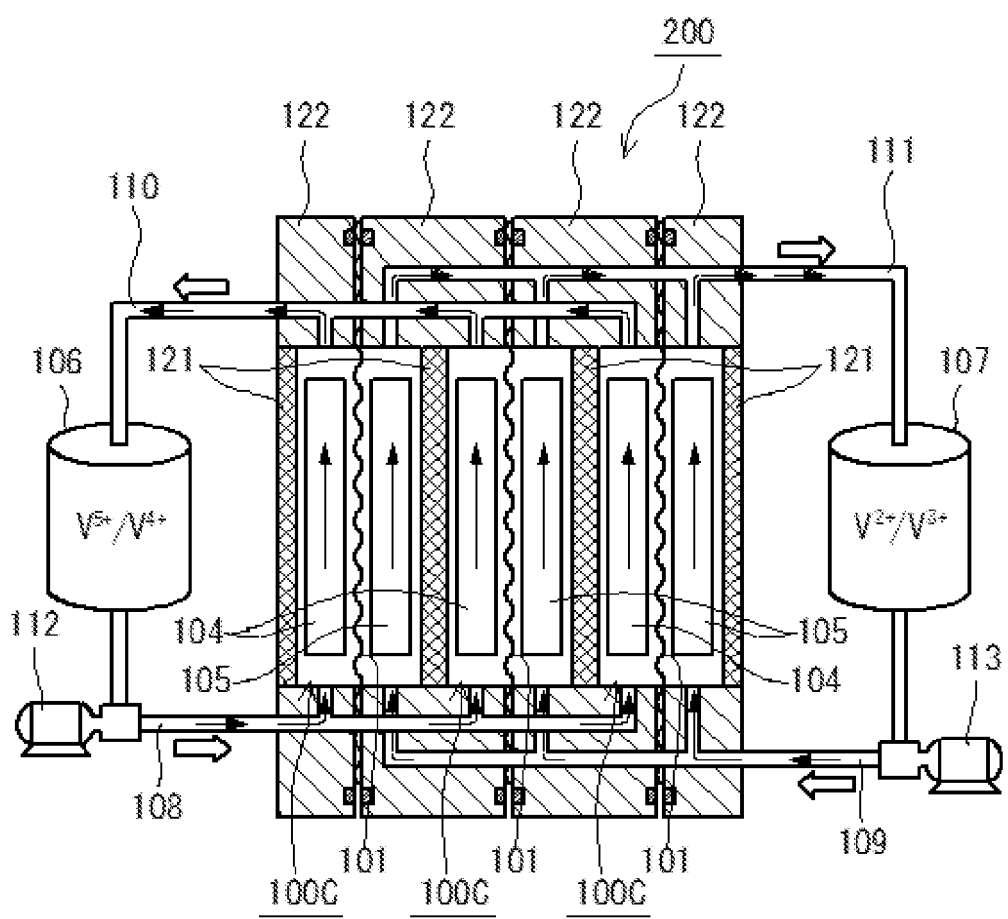
FIG. 11 is a schematic diagram of a redox-flow battery provided with a cell stack including a plurality of layered bodies, each layered body including a cell frame, a positive electrode, a membrane, and a negative electrode stacked in this order.

In Embodiment 6, a redox-flow battery which includes a cell stack including a plurality of layered bodies which are stacked, each layered body including the cell frame, a positive electrode, a membrane, and a negative electrode stacked in this order, will be described with reference to FIG. 11. Since the redox-flow battery includes the cell stack according to the embodiment of the present invention, the flow resistance of the electrolyte in the battery cell can be decreased, and it is possible to suppress a decrease in the battery reaction area in the electrode. Accordingly, the internal resistance of the battery can be decreased.

Test Example 1

In Test Example 1, regarding an RF battery in which a bipolar plate provided with a flow path having an interlocking type comb-tooth shape was placed at a predetermined position, a battery cell was actually produced and the internal resistance of the RF battery was checked. In Test Example 1, two types of RF battery were produced: i.e., Sample No. 1-1 in which a bipolar plate provided with a flow path having a vertical groove structure was used and Sample No. 1-11 in which a bipolar plate provided with a flow path having a horizontal groove structure was used. Specifications of the RF batteries used are shown below. In Test Example 1, RF batteries having a single-cell structure were produced in which a battery cell including a positive electrode-membrane-negative electrode stack was sandwiched between cell frames including bipolar plates. Accordingly, the internal resistance of the RF battery is shown as cell resistivity.

[Sample No. 1-1]
Bipolar Plate
Dimensions: length 200 mm, width 198 mm, thickness 6.2 mm
Shape of flow path: interlocking type opposed comb-tooth shape including an introducing path and a discharging path (refer to FIG. 1)

Vertical Groove Sections
Number: 16 introducing paths×16 discharging paths
Length Ly: 150 mm
Overlap length Lo: 142 mm
Width Wy: 1.3 mm
Depth D: 1.0 mm
Inter-groove distance R: 3.9 mm
Cross-sectional shape: rectangular shape
Horizontal Groove Section
Length Lx: 170 mm
Constituent material: bipolar plate obtained by powder compression molding by using 80% graphite and 20% polypropylene as a matrix resin
Electrode
Dimensions: length 170 mm, width 150 mm, thickness 0.5 mm
Constituent material: carbon felt containing carbon fiber and binder carbon GDL10AA manufactured by SGL CARBON JAPAN Co., LTD.
Membrane
Constituent material: Nafion (registered trademark) 212 manufactured by E.I. du Pont de Nemours and Company
Electrolyte
Composition: aqueous V sulfate solution (V concentration: 1.7 mol/L, sulfuric acid concentration: 4.3 mol/L)
Flow rate: 5.4 mL/min
[Sample No. 1-11]
Bipolar Plate
Dimensions: length 200 mm, width 198 mm, thickness 6.2 mm
Shape of flow path: interlocking type opposed comb-tooth shape including an introducing path and a discharging path
Introducing path: including an introduction port, a vertical groove section which extends in the longitudinal direction of the bipolar plate (in the vertical direction), and a plurality of horizontal groove sections which extend from the vertical groove section in the horizontal direction of the bipolar plate (in a direction orthogonal to the vertical direction) and are arranged in parallel with a predetermined distance therebetween.
Discharging path: including a discharge port, a vertical groove section which extends in the longitudinal direction of the bipolar plate (in the vertical direction), and a plurality of horizontal groove sections which extend from the vertical groove section in the horizontal direction of the bipolar plate (in a direction orthogonal to the vertical direction) and are arranged in parallel with a predetermined distance therebetween.
Flow of electrolyte: introduction port→introduction-side vertical groove section→introduction-side horizontal groove sections→discharge-side horizontal groove sections→discharge-side vertical groove section→discharge port
Horizontal Groove Sections
Number: 16 introducing paths×16 discharging paths
Length Lx: 150 mm
Overlap length Lo: 142 mm
Width Wy: 1.3 mm
Depth D: 1.0 mm
Inter-groove distance R: 3.9 mm
Cross-sectional shape: rectangular shape
Vertical Groove Section
Length Ly: 170 mm
Electrode, Membrane, and Electrolyte: Same as Those of Sample No. 1-1
After an electrolyte was supplied to fill the produced RF battery having a single-cell structure in each sample (in an empty state without an electrolyte), charging and discharging were performed at constant current with a current density of 0.2 A/cm$^2$. In Test Example 1, when a predetermined switching voltage was reached, switching was performed from charging to discharging, and a plurality of cycles of charge and discharge were performed. After each cycle of charge and discharge, cell resistivity ($\Omega \cdot cm^2$) was obtained for each sample. The cell resistivity was determined by obtaining a difference between an applied voltage during charging and an applied voltage during discharging in each cycle and an applied current, and calculating the ratio of voltage to current.

Figure 9:
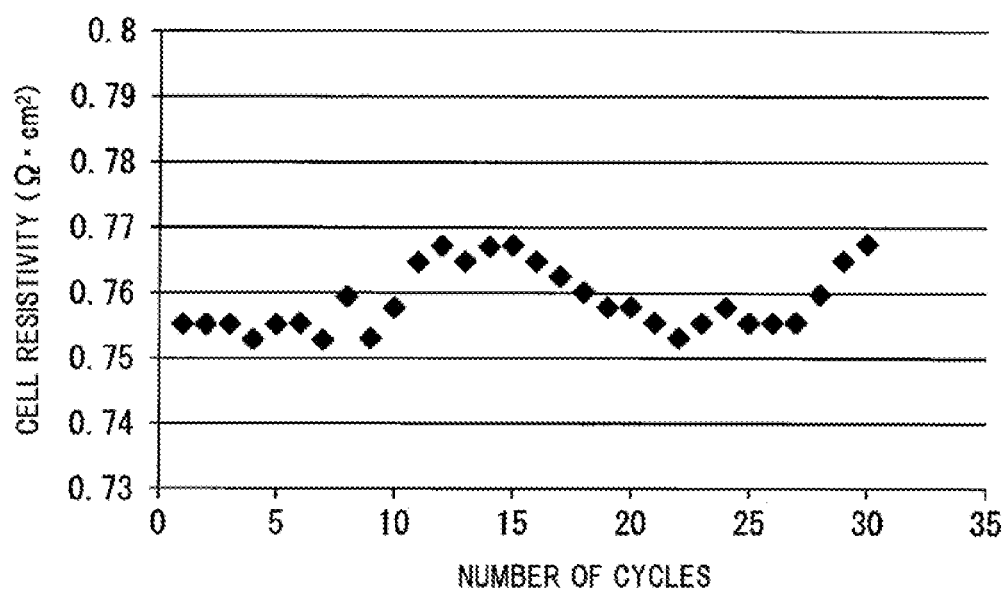
FIG. 9 is a graph showing the relationship between the number of cycles and the cell resistivity regarding Sample No. 1-1 according to Test Example 1.
Figure 10:
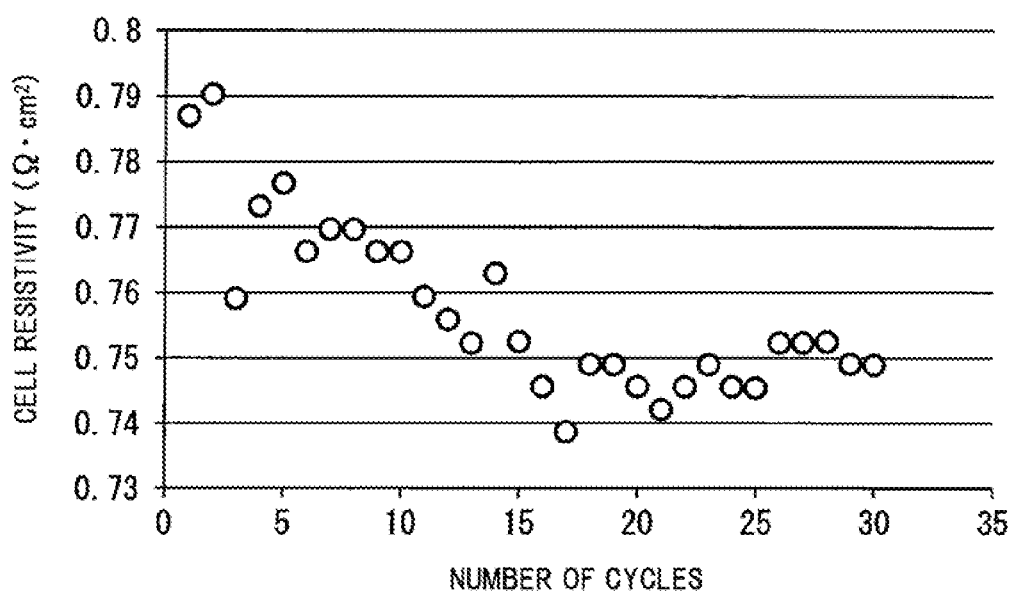
FIG. 10 is a graph showing the relationship between the number of cycles and the cell resistivity regarding Sample No. 1-11 according to Test Example 1.

The results of Sample No. 1-1 are shown in FIG. 9, and the results of Sample No. 1-11 are shown in FIG. 10. In each of FIGS. 9 and 10, the horizontal axis represents the number of cycles of charge and discharge, and the vertical axis represents the cell resistivity ($\Omega \cdot cm^2$).

As is evident from FIG. 9, in Sample No. 1-1 which uses a bipolar plate provided with a flow path having a vertical groove structure, an increase in cell resistivity is not observed from the beginning of the start of operation of the RF battery, and stable operation can be performed. The reason for this is considered to be that, in the case where a bipolar plate provided with a flow path having a vertical groove structure is used, since the bipolar plate is provided with vertical groove sections which extend in the vertical direction and are arranged in parallel, bubbles that can be generated during electrolyte filling have been able to be discharged upward. Since bubbles have been able to be discharged, it is considered that a decrease in the battery reaction area in the electrode due to bubbles does not substantially occur from immediately after start of operation of the RF battery.

On the other hand, as is evident from FIG. 10, in Sample No. 1-11 which uses a bipolar plate provided with a flow path having a horizontal groove structure, a variation in cell resistivity occurs during a period immediately after start of operation to about 20 cycles. The reason for this is considered to be that, in the case where a bipolar plate provided with a flow path having a horizontal groove structure is used, since horizontal groove sections which extend in a direction orthogonal to the vertical direction and are arranged in parallel mainly occupy the bipolar plate, bubbles that can be generated during electrolyte filling rise due to buoyancy, hit wall surfaces of the horizontal groove sections, and stay in the electrode. When bubbles stay in the electrode, it is considered that the battery reaction area in the electrode is decreased, and battery reactions cannot be conducted sufficiently. Note that, as is evident from the results, in Sample No. 1-11 in which the flow path has a horizontal groove structure, the cell resistivity tends to be stabilized at about 20 or more cycles of charge and discharge. The reason for this is considered to be that because of circulation of the electrolyte in the battery cell, bubbles are discharged over a long period of time.

The invention claimed is:

1. A bipolar plate for a battery, the bipolar plate having a positive electrode disposed on a first surface side thereof and a negative electrode disposed on a second surface side thereof,
   wherein at least one of the first surface and the second surface is provided with a flow path through which an electrolyte flows;
   the flow path includes an introduction port for the electrolyte, a discharge port for the electrolyte, and a groove section which is located between the introduction port and the discharge port and guides the electrolyte to a predetermined route;

the groove section includes a plurality of vertical groove sections which extend in a vertical direction and are arranged in parallel in a direction orthogonal to the vertical direction when the bipolar plate is placed at a predetermined position in the battery;

an inter-groove distance between side edges of adjacent vertical groove sections is from more than 100% to 700% of a width of the vertical groove section;

the flow path includes an introducing path and a discharging path which are not in communication with each other;

the introducing path and the discharging path each include a comb-tooth-shaped path, the comb-tooth-shaped paths being arranged to face each other in an interlocking manner, and the comb-tooth-shaped paths are provided with the vertical groove sections;

a length of the portion where the comb-tooth-shaped paths are interlocked with each other is 80% to 99% of a length of the vertical groove section; and the depth of the groove is 10% to 45% of the thickness of the bipolar plate.

2. The bipolar plate according to claim 1, wherein a length for which adjacent vertical groove sections overlap each other in the parallel direction is 45% or more of a length in the vertical direction of the bipolar plate.

3. The bipolar plate according to claim 1, wherein the width of the vertical groove section is 0.1 to 10 mm.

4. The bipolar plate according to claim 1, wherein both surfaces of the bipolar plate are provided with the flow path, and when the bipolar plate is viewed in perspective plan, the vertical groove sections on the positive electrode side and the vertical groove sections on the negative electrode side are at least partly located at positions that do not overlap each other.

5. The bipolar plate according to claim 1, wherein the groove section includes at least one of a liquid supply rectifying portion which connects the introduction port to all introduction-side ends of the vertical groove sections and a liquid discharge rectifying portion which connects the discharge port to all discharge-side ends of the vertical groove sections.

6. A cell frame comprising the bipolar plate according to claim 1 and a frame body provided on an outer periphery of the bipolar plate.

7. A cell stack comprising a plurality of layered bodies which are stacked, each layered body including the cell frame according to claim 6, a positive electrode, a membrane, and a negative electrode stacked in this order.

8. A redox-flow battery comprising the cell stack according to claim 7.

\* \* \* \* \*